United States Patent [19]
Lam et al.

[11] Patent Number: 5,676,577
[45] Date of Patent: Oct. 14, 1997

[54] FRICTION LINING MATERIALS

[75] Inventors: Robert Chi-Chiu Lam, Bensenville; Yih-Fang Chen, Lisle, both of Ill.

[73] Assignee: Borg-Warner Automotive, Inc., Sterling Heights, Mich.

[21] Appl. No.: 610,800

[22] Filed: Mar. 7, 1996

Related U.S. Application Data

[63] Continuation of Ser. No. 284,330, Aug. 2, 1994, abandoned.

[51] Int. Cl.$^6$ ........................................ B32B 27/00
[52] U.S. Cl. .................. 442/60; 442/74; 442/75; 442/101; 442/295.1; 442/297.4; 523/156; 523/155; 523/157
[58] Field of Search .................. 442/60, 74, 75, 442/101, 295.1, 297.4; 523/156, 155, 157

[56] References Cited

U.S. PATENT DOCUMENTS

| | | |
|---|---|---|
| 4,130,537 | 12/1978 | Bohrer . |
| 4,256,801 | 3/1981 | Chuluda ........................ 428/280 |
| 4,374,211 | 2/1983 | Gallagher et al. . |
| 4,743,634 | 5/1988 | Royer ........................ 523/150 |
| 5,240,766 | 8/1993 | Foster . |

FOREIGN PATENT DOCUMENTS

| | | |
|---|---|---|
| 0640774 | 3/1995 | European Pat. Off. . |
| 4211010 | 10/1992 | Germany . |

OTHER PUBLICATIONS

SAE Technical Paper Series, "Friction Material for Continuous Slip Torque Converter Applications: Anti–Shudder Considerations", 941031, Feb. 28–Mar. 3, 1994.

Technical Data Sheets for Celite Corporation, Apr. 25, 1993.

European Search Report corresp. to USSN 08/284,330 Ingenieurs de l'Automobile, vol. 653, Dec. 1989 Courbevoie (FR), pp. 72–77, S. Spiliadis.

*Primary Examiner*—Kathleen Choi
*Attorney, Agent, or Firm*—Emch, Schaffer, Schaub et al; Greg Dziegielewski

[57] ABSTRACT

The present invention relates to a fibrous base material comprising fibrillated aramid fibers, cellulose fibers, and at least one type of filler material and a non-asbestos friction material produced therefrom by impregnating the fibrous base material with a phenolic or modified phenolic resin. The friction material exhibits good anti-shuddering properties and is especially useful in continuous slip clutch applications.

6 Claims, 16 Drawing Sheets

FRICTION LINING MATERIALS

This application is a continuation of application Ser. No. 08/284,330 filed on Aug. 2, 1994, now abandoned.

TECHNICAL FIELD

The present invention relates to a fibrous base material comprising cellulose fibers, aramid fibers and a filler material, such as diatomaceous earth. The invention further relates to a composite friction material comprising the above described fibrous base material impregnated with a phenolic or phenolic-based resin.

The friction material of the present invention has better anti-shudder performance and better long term durability than conventional friction materials. The friction material is especially useful in electronically controlled continuous clutch applications.

BACKGROUND ART

New and advanced continuous slip torque converter transmission systems are being developed by the automotive industry. These new systems are different from conventional lock-up transmissions. The continuous slipping torque converter clutch provides a controlled, continuous slip at low engine speeds. Use of the continuous slipping torque converter clutch improves fuel economy and cooling of the engine.

However, the continuous engagement of such continuous slip torque converter clutch produces low frequency vibrations or "shudder" in the engine. One factor affecting the shudder resistance of the continuous slip torque converter clutch is the property of the friction materials used in the torque converter clutch. Therefore, the friction materials technology must be also developed to meet the requirements of these advanced systems.

In order for friction materials to be useful in continuous slip applications, the friction material must have a wide variety of acceptable characteristics. The friction material must be resilient or elastic yet resistant to compression, abrasion and stress; have high heat resistance and be able to dissipate heat quickly; and, have long lasting, stable and consistent frictional performance. If any of these characteristics are not met, optimum performance of the friction material is not met.

Thus, the fibrous base material must possess good shear strength when being saturated with the wet resin during the friction paper making impregnation process. Also, the resulting friction paper must possess good shear strength when permeated with brake fluid or transmission oil during use. It is also important that the friction material have a high porosity such that there is a high fluid permeation capacity during use. The fluids absorbed into the friction material must be capable of being squeezed or released from the friction material quickly under the pressures applied during the continuous clutch operation. It is also important that the friction material have high thermal conductivity to also help rapidly dissipate the heat generated during operation of the continuous clutch transmission.

Accordingly, it is an object of the present invention to provide an improved friction material with reliable and improved properties compared to those of the prior art.

A further object of this invention is to provide friction materials with good anti-shudder and low noise performance.

DISCLOSURE OF THE INVENTION

In order to achieve the requirements discussed above, many materials were evaluated for friction and heat resistant characteristics under conditions similar to those encountered during operation of a continuous slipping clutch. Both commercially available brake linings and transmission materials were investigated and proved not to be suitable for use in continuous slip clutch applications.

The present invention relates to a novel friction material which is especially useful in continuous slip clutch applications. The present invention provides a fibrous base material comprising aramid fibers, cellulose fibers, a filler material and optionally other ingredients. The fibrous base material can be impregnated either with phenolic resins or modified phenolic resins.

In preferred embodiments, aramid fibers comprise fibrillated fibers which help hold the film material on the surface of the friction paper. It is also preferred that the amount of filler material be present at higher percentages, based on weight of the friction material, than found in currently used friction materials. Further, it is desirable that the filler material provides the friction material with a smooth surface when the friction material is continuously engaged in a continuous slip application. Further, it is desirable that the filler material have elastic properties which provide a dampening effect when vibrations occur at low engine speeds, the friction material is elastic enough to absorb vibrations and prevent shuddering or noise from occurring at low engine speeds.

BRIEF DESCRIPTION OF DRAWINGS

FIG. 3 is a graph showing the results of a dynamometer test of different materials, a comparative high compression modulus material A and a low compression modulus material B of the present invention.

BEST MODE OF CARRYING OUT THE INVENTION

Figure 1:
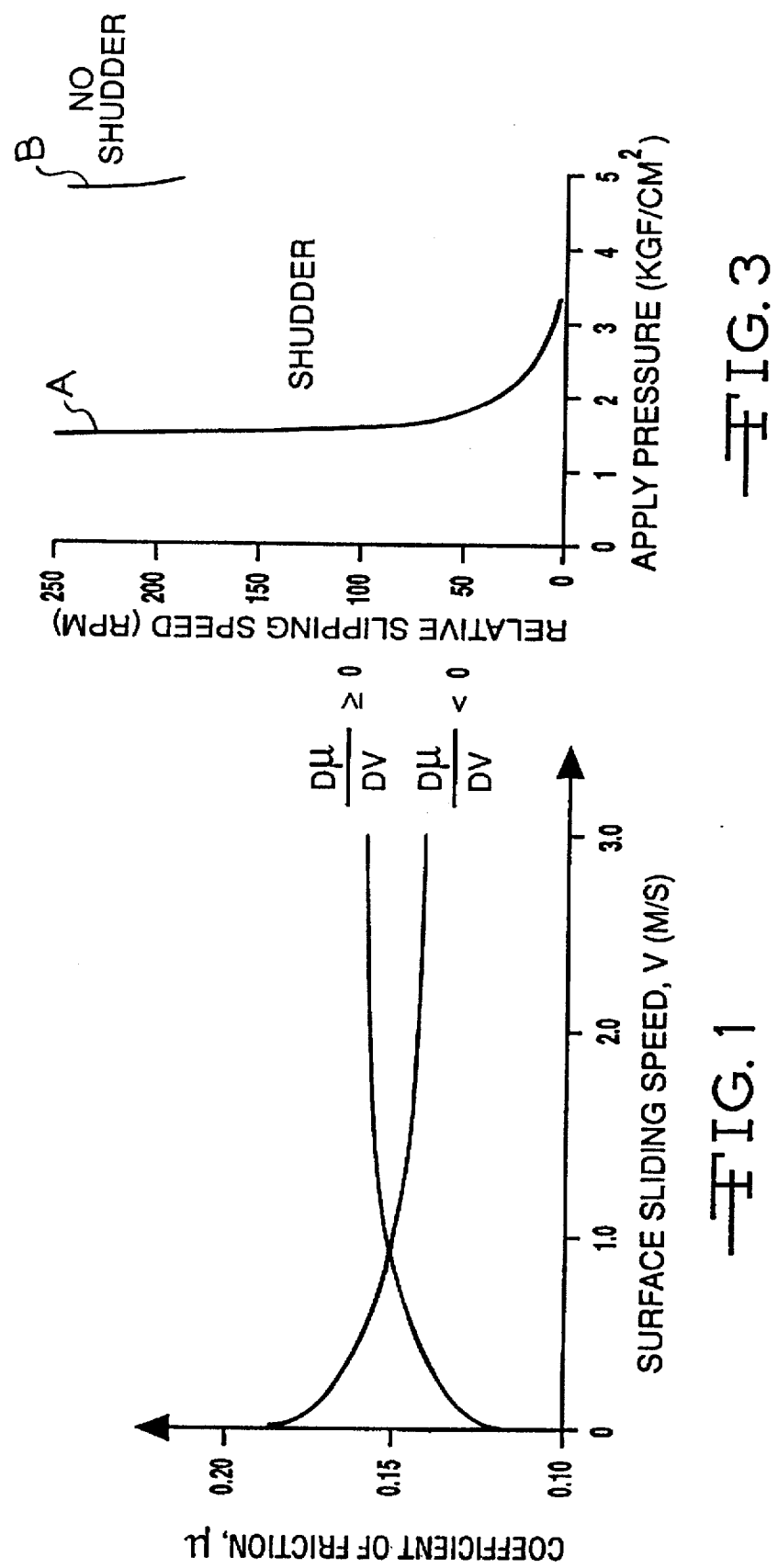
FIG. 1 is a general graph depicting the desirable and undesirable relationship between the coefficient of friction and surface sliding speed for friction materials. When the coefficient-speed curve has a positive slope as in the case of $d\mu/dv \geq 0$ no shudder occurs. In contrast, when the coefficient-speed curve has a negative slope, as in the case of $d\mu/dv < 0$, shuddering occurs in a continuous slip torque converter clutch.

While various friction lining materials disclose the use of aramid fibers, it has not been known until the present invention to provide a friction material comprising fibrillated aramid fibers (which generally have many fibrils attached to a core fiber) and an increased amount of filler material. The length of the fibrillated fiber ranges from about 0.5 to about 6 mm and has a Canadian Standard Freeness of greater than about 150 to about 650. In certain embodiments, it is preferred to have fibers having a Canadian Standard Freeness ranging from about 150 to about 450 and most preferably about 200. The "Canadian Standard Freeness" (T227 om-85) means that the degree of fibrillation of fibers can be described as the measurement of freeness of the fibers. The Canadian Standard Freeness test is an empirical procedure which gives an arbitrary measure of the rate at which suspension of three grams of fibers in one liter of water may be drained. Therefore, the fibrillated aramid fibers have a lower freeness or a lower rate of drainage than other less fibrillated aramid fibers or pulp.

The more fibrillated aramid fibers in the fibrous base material act to hold or retain the filler material onto the surface of the fibrous base material. It has not been known until the present invention to include an increased amount of filler material in a fibrous base material comprising fibrillated aramid fibers and cellulose fibers. The use of an increased filler content in the fibrous base material provides a smoother surface structure to the friction material than prior friction materials having a lower filler material content. The increased filler content provides the friction material with the ability to dampen the vibration of the transmission more effectively than prior types of friction materials.

The damping effect of the filler material which is held onto the surface of the fibrous base material by the fibrillated aramid fibers also causes the friction material to have better elastic properties. If vibration does occur, especially at low speeds, the friction material is elastic enough to absorb or dampen the vibrations and prevent shuddering. The size of the filler material is preferred to be in the range of about 6 to about 38 microns in diameter and most preferably having a mean diameter size of about 10 to about 15 microns and in certain embodiments, about 12 microns. It has been discovered that if the size is too large, the surface of the friction material is too rough. If the filler particle size is too small, then the filler material become too densely packed in the fibrous base material and the resulting friction material is not sufficiently porous to quickly absorb the automatic transmission fluid and effectively to dissipate heat.

Various fillers materials are useful in the fibrous base material of the present invention. In particular, glass beads, silica fillers such as diatomaceous earth, generally spherical carbon particles, and irregularly shaped glass or silica particles are useful. The most useful filler particles provide the friction material with both anti-shudder properties and high wear properties. However, it is contemplated that other types of fillers and, optionally other ingredients are suitable for use in the present invention and that the choice filler depends on the particular requirements of the friction material.

The fibrous base material of the present invention further includes cellulose fibers which provide good anti-shudder properties. The cellulose fibers also provide strength to the friction material and provide a high initial coefficient of friction. An increased amount of cellulose fibers raises the coefficient of friction, as shown in FIG. 1, such that there is positive slope to the relationship between coefficient of friction and surface sliding speed. In certain embodiments, the cellulose fibers comprise cotton, hemp and other like materials. In certain preferred embodiments, the cellulose fibers comprise both hemp fibers and cotton fibers. The hemp fibers are flatter than cotton fibers and are believed to aid in providing surface smoothness and anti-shudder performance to the friction material.

Various phenolic or modified phenolic resins are useful as impregnating resins in the present invention. It is further contemplated that other ingredients known to be useful in both preparing resin blends and in various resins useful for impregnating fibrous base materials can be included in the fibrous base material and the resulting friction material. In particular embodiments, the resin content ranges from about 35 to about 65%, by weight, pickup of resin based on the weight of the friction material. In a preferred embodiment, the resin content ranges from about 40 to about 60%, by weight, and in certain embodiments the resin content can be about 45%, by weight. The amount of resin affects the elasticity of the friction material. Too much resin material causes the friction material to become too rigid and there is a loss of elasticity of the friction material. The resin-fiber interaction aids in providing strength to the friction material.

One example of a formulation for a fibrous base material comprises about 10 to about 40%, by weight, of a fibrillated aramid fiber; about 5 to about 30%, by weight, of at least one type of cellulose fiber and about 30 to about 75%, by weight, of a filler material. In certain embodiments, one particular formulation has found to be useful comprises about 15 to about 25%, by weight, fibrillated aramid fibers; about 5 to about 30%, by weight, cellulose fibers; and, about 45 to 70%, by weight, filler material. Another useful formulation comprises about 22 to about 25%, by weight, aramid fibers; about 13 to about 25%, by weight, cellulose fibers; and about 50 to about 65%, by weight, filler material.

Figure 2:
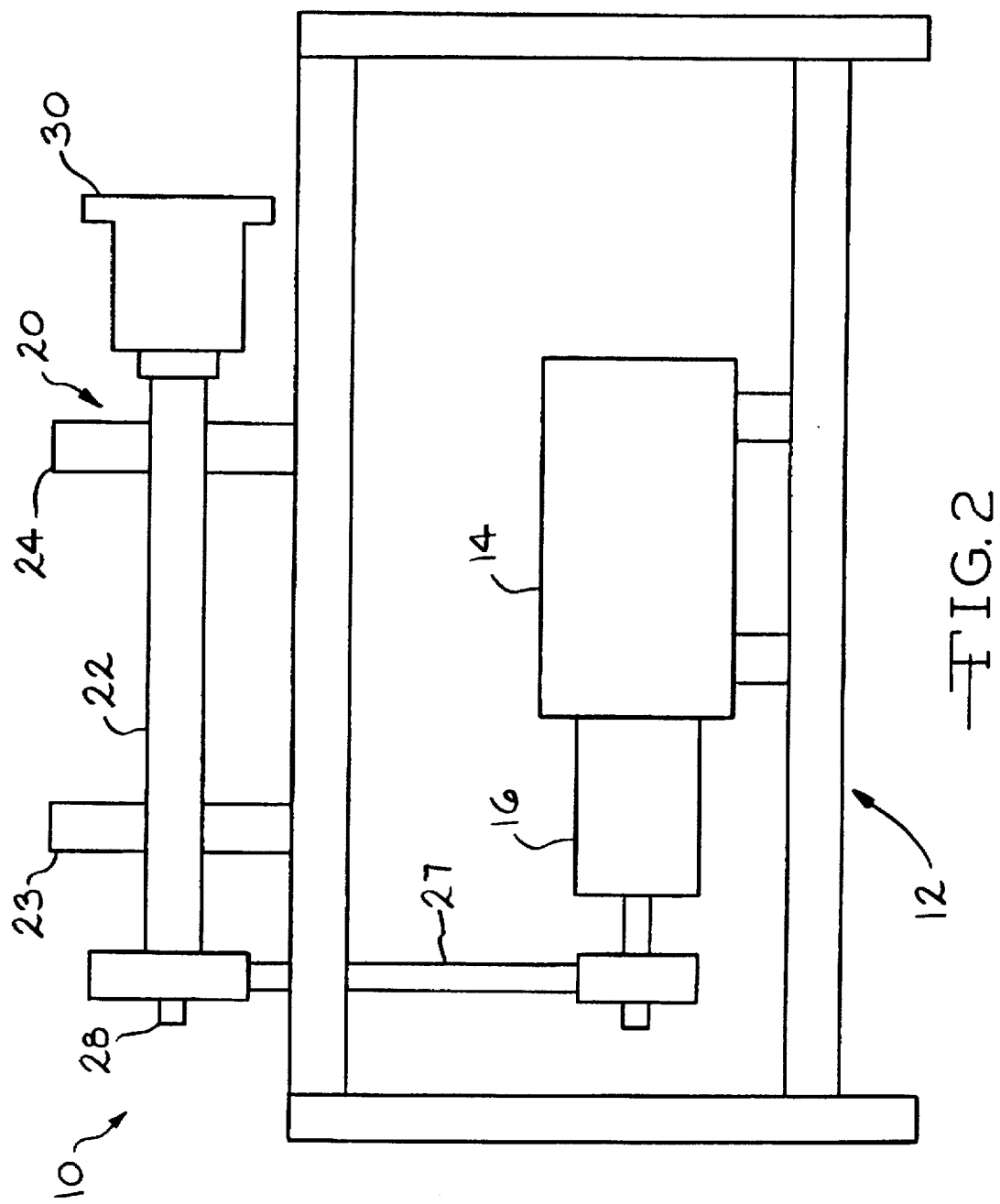
FIG. 2 is a schematic diagram of a continuous slip test instrument used to study shudder behavior in various friction materials.

Test equipment and methods for determining the friction behaviors of various friction materials at low velocity slipping conditions will first be briefly described. A test instrument 10 used to study the shudder behavior of various friction materials is shown in FIG. 2. A drive system 12 is composed of an electric motor 14 with an eddy current clutch 16 for speed control. Output from the eddy current clutch 16 is used to drive a shaft assembly 20 which consists of a drive shaft supported by two bearing assemblies 22 and 24 with a test fixture on one end and drive pulley on the other end. Speed is monitored by an optical encoder 28. A test chamber 30 utilizes a standard SAE #2 test head with an attached torque arm (not shown). A full-sized clutch plate is immersed in uncirculated oil inside the chamber for testing (not shown).

The test chamber of oil temperature is controlled by circulating hot or cold oil through the test head's hollow cavities. The temperature of the circulating oil is either heated up by an electric immersion heater or cooled down by a heat exchanger using water as the coolant. Air pressure is applied to the clutch plate using a standard SAE #2 piston. Speed, torque, apply pressure, and oil temperature are recorded during the test.

In order to overcome these limitations, the continuous slip test instrument in FIG. 2 was developed to accommodate the actual friction plate used to determine the friction behavior of various friction materials at low slipping velocities at different temperatures and pressures.

The test procedure utilized herein characterizes the coefficient of friction versus slipping relationships of different friction materials under different lining pressures, surface speeds, and oil temperatures before and after break-in. Various levels of the continuous slip are noted. The slipping time at each speed is 5 secs. The sliding speed (m/sec) increases from 0.006 through 3.0 and back down to 0.006 as seen in the figures below. At level A■, the oil temperature is 40° C., lining pressure is 980 MPa; level B☐, the oil temperature is 100° C., lining pressure is 980 MPa; level C♦, the oil temperature is 100° C., lining pressure is 980 MPa (level C is the break-in); level F◊, the oil temperature is 40° C., lining pressure is 1470 MPa; and level I▲, the oil temperature is 100° C., lining pressure is 1470 MPa.

Levels A and B describe the coefficient-speed behaviors of various friction materials before break-in. Level C is the break-in period which runs at a constant speed of 0.6 m/s for 5 minutes. Levels D, F and I describe the coefficient-speed behaviors of various friction materials after break-in.

By using this method, the criteria for predicting shudder are where "$\mu$"=coefficient of friction and "v"=surface sliding speeds:

1) $d\mu/dv \geq 0$ (0 to 3 m/s) No shudder
2) $d\mu/dv \geq 0$ (0 to 3 m/s) Shudder The sliding speed of 3m/s is equivalent to a 10" torque converter rotating at a relative speed of 250 rpm.

Initial shudder refers to the shudder phenomena observed at the initial stages of continuously slipping operations, which are affected by the friction material properties and structures.

There is a relationship between the friction material surface structure and the absorption of the fluid, such as automatic transmission fluid (ATF). Shearing of the oil film between the friction materials and metal mating surface occurs at low slipping velocities (0–0.3 m/s).

Referring now to FIG. 3, comparative material A comprises a fibrous base material which comprises about 30% cotton fibers, about 25% fibers of the less fibrillated aramid type, about 25% celite filler and about 25% graphite impregnated with a phenolic resin. Example B comprises a fibrous base material which comprises about about 21% aramid pulp, about 14% cellulose fiber and about 65% celite filler impregnated with a phenolic resin.

During continuous slip operations, a film of material can be formed on this surface of the friction material. The film can be analyzed and determined by Gel Chromatography (GC) as described in Bunda, T., et al., "Friction Behavior of Clutch-Facing Materials: Friction Characteristics in Low-Velocity Slippage", SAE 720522 (1972). It is easier to form a film with material that has a rigid surface (high modulus) than a compressible surface (low modulus), due to the differences in conformity. The formation of film on the surface greatly affects the coefficient of friction-speed relationship (anti-shudder) of the materials. The film material hinders the adsorption capability and damping effects of the friction materials.

In the dynamometer tests summarized in FIG. 3, comparative material A (high compression modulus) exhibited a narrower range of shudder-free pressure and slipping speed than the Example 13 (low compression modulus).

Damping Effects—The damping effects provided by the surface of the friction materials are important in eliminating the shudder or low frequency vibration in continuously slipping clutches. Damping from the friction materials are achieved by increasing the compressibility of the surface and/or increasing the surface area of the damping agents in the friction material.

Fiber Effects—In order to understand the effects of fibers on the shudder resistance of friction materials for continuous slip clutch applications, a series of fibers were studied: These fibers vary in shape and composition, and have different surface characteristics and structures.

Interface Temperature—The degree of degradation of ATF additives during the continuous slip operation is affected by the temperature at the interface of friction material, ATF, and mating surface. At a high interface temperature, the friction modifier in the ATF for anti-shudder can be degraded and deposited on the friction surfaces thereby causing long-term shudder phenomena. The friction modifiers will no longer serve the purpose of anti-shudder performance because of the chemical degradation. One way of reducing the interface temperature is by increasing the thermal conductivity of the friction materials.

The friction material surface structures can be altered significantly with different interface temperatures. Under a high interface temperature, most ATF friction modifiers will start to degrade and interact with the friction material surfaces. In addition, the rate of carbonization of the ingredients in the friction materials is higher at a higher interface temperature. The wear of friction materials is directly related to the rate of carbonization of materials.

The initial shudder resistance of friction materials is affected by ATF friction modifier surface adsorption capability of friction materials, elasticity of friction materials, damping effects of the friction materials, oil temperature, and slipping velocities. The long-term durability and shudder resistance are affected by the heat transfer capability of friction materials, interfacial temperatures, and surface treatment of friction materials.

The anti-shudder material of the present invention exhibits properties such as high ATF adsorption capability, high elasticity, high damping effects, high heat transfer capability, low interface temperature, and proper surface treatment.

The following examples provide further evidence that the fibrous base material and friction material of the present invention are an improvement over the conventional friction materials. Various preferred embodiments of the invention are described in the following examples, which however, are not intended to limit the scope of the invention.

EXAMPLE I

The friction materials of the present invention were evaluated in various automatic transmission fluids. Table I below shows the examples, the percent of resin pickup and the type of automatic transmission fluid used in the tests.

The friction material of the present invention performs well in various types of automatic transmission fluids. As can be seen in FIGS. 4–8, the initial slope of the continuous slip test is positive.

TABLE I

| FIGS. | Paper | Resin | ATF |
|---|---|---|---|
| 4 | ES-168-93 | Phenolic | T II |
| 5 | ES-15-94 | Phenolic | T II |
| 6 | ES-15-94 | Phenolic | Mercon |
| 7 | ES-168-93 | Phenolic | T II |
| 8 | ES-149-93 | Mod. Phenolic | T II |
| 9 | ES-15-94 | Mod. Phenolic | T II |

Figure 4:
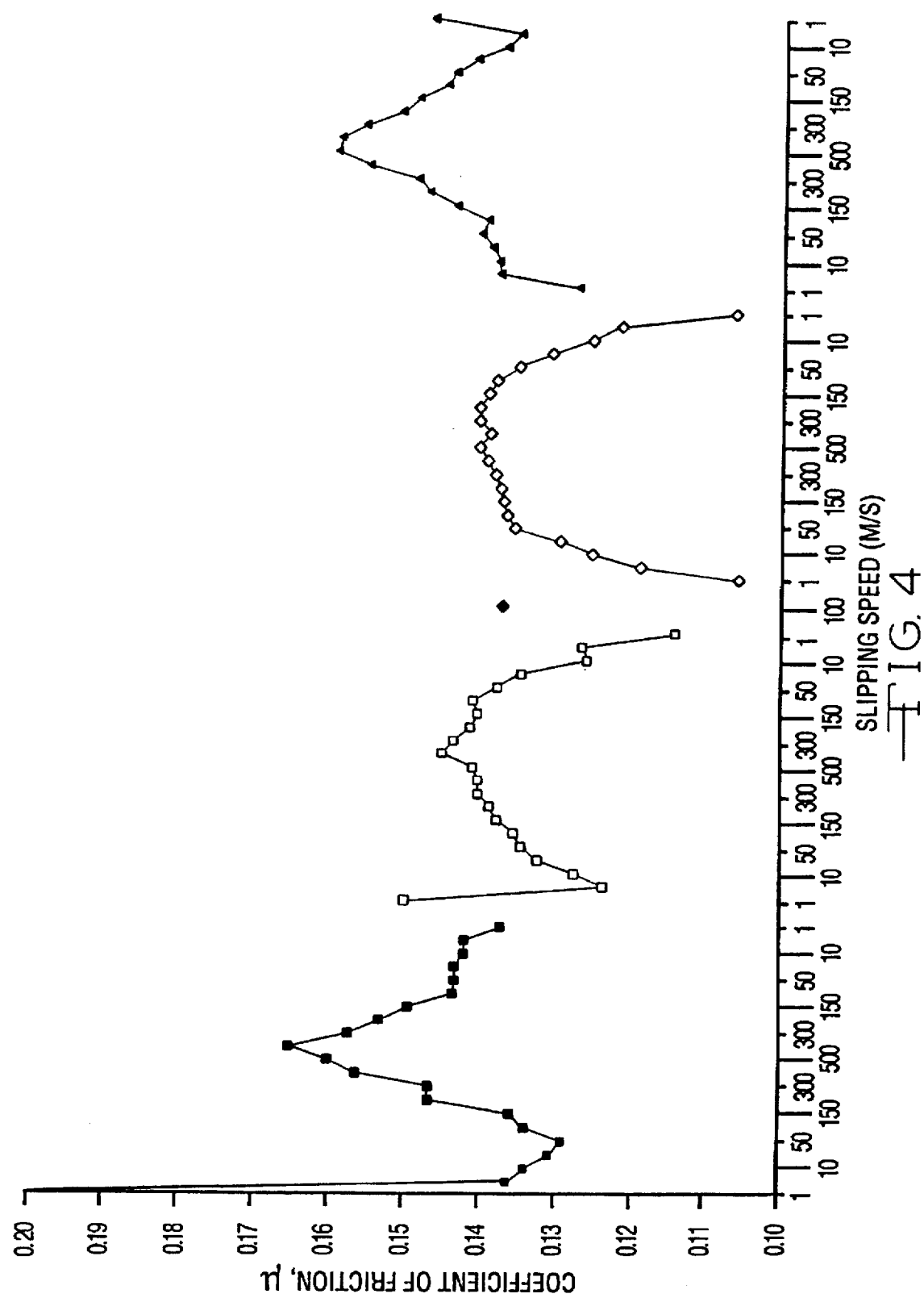
FIGS. 4–9 are graphs showing the peak coefficient of friction versus slipping speed relationship for fibrous base materials impregnated with phenolic or modified phenolic resins in various automatic transmission fluids for the examples as shown in Table I and Example I herein.
Figure 5:
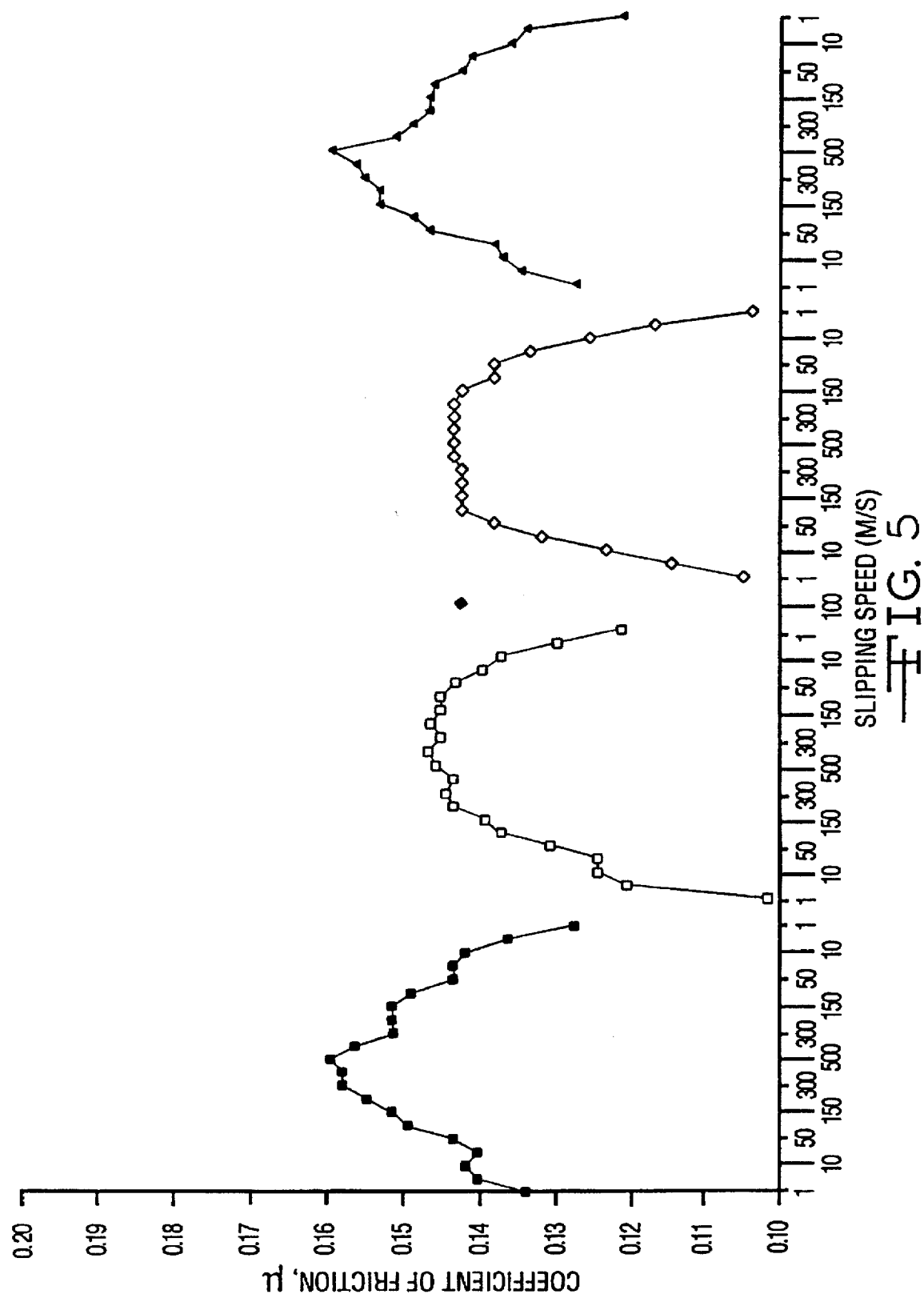
Figure 6:
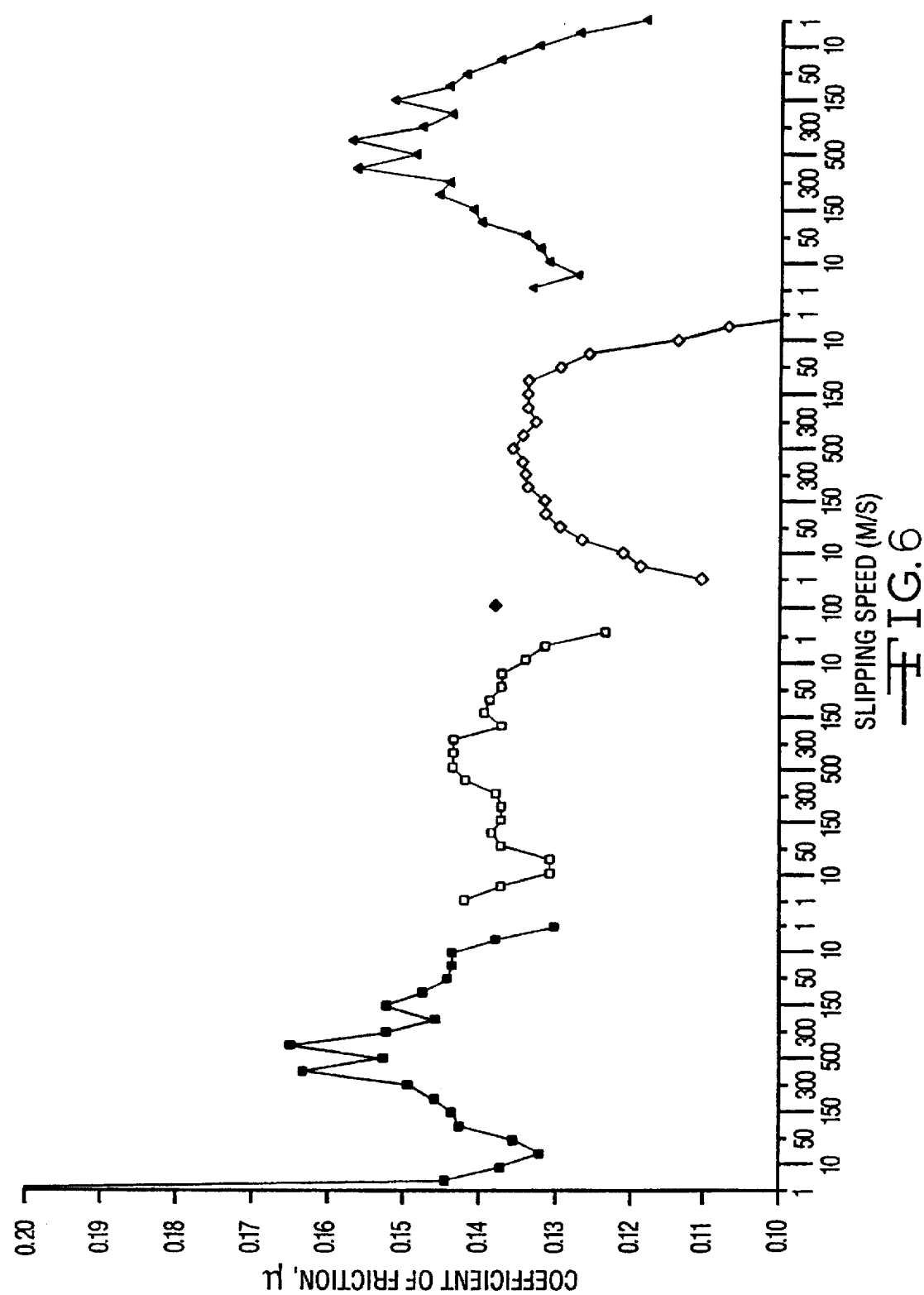
Figure 7:
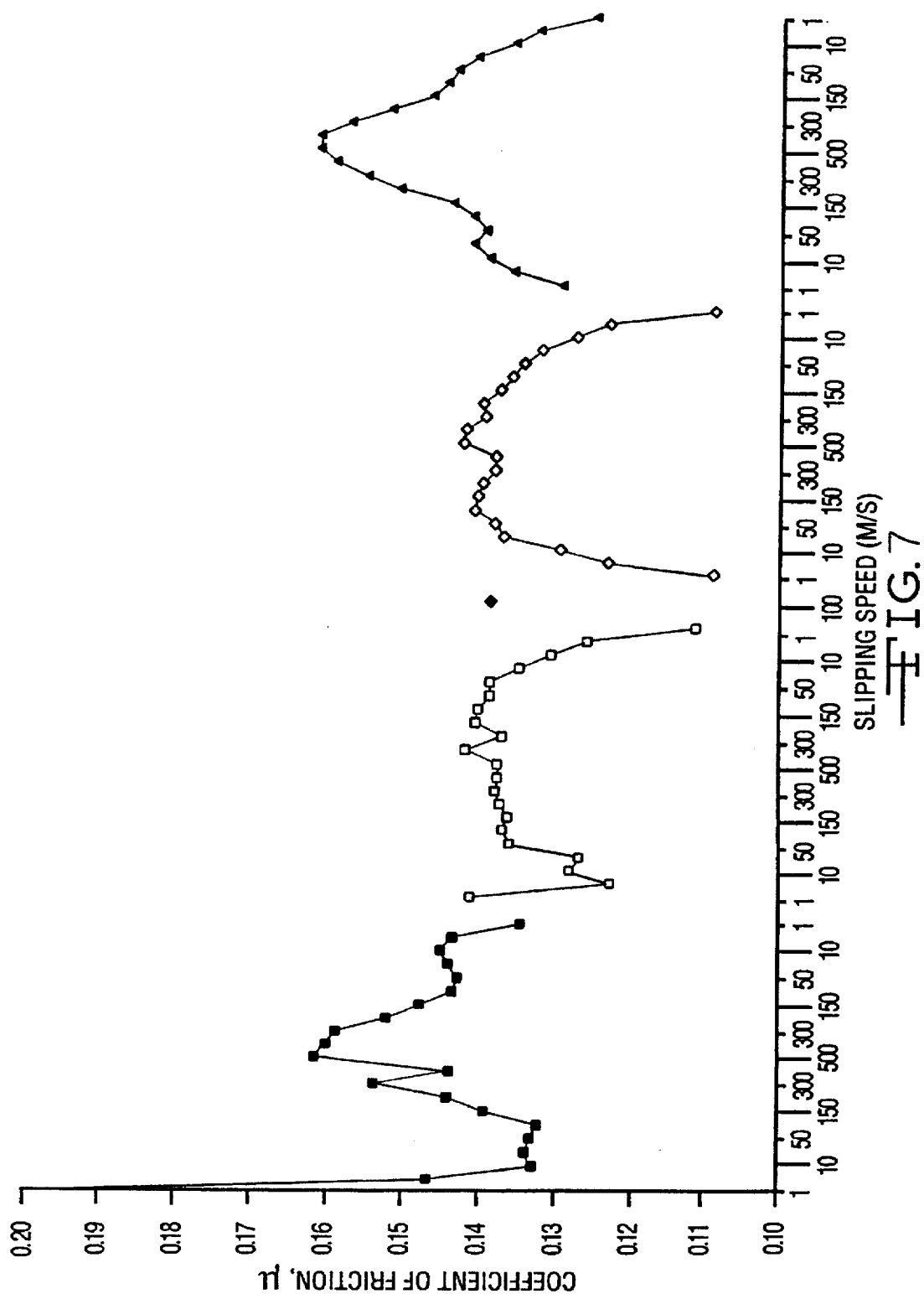

FIGS. 4–9 show the results of a continuous slip test showing the peak coefficients of friction for materials of the present invention in various automatic transmission fluids (ATF). FIGS. 4 and 7 show the continuous slip tests for the fibrous base material (ES-168-93) comprising about 13% cellulose fibers, about 22% Kevlar® aramid fiber pulp and about 65% diatomaceous earth filler material which is impregnated with a phenolic resin at about 57% resin pickup (% P.U.).

FIGS. 5 and 6 show a continuous slip test showing peak coefficients of friction for a fibrous base material (ES-15-94) comprising about 14% cellulose fibers, about 21% Kevlar® aramid fiber pulp and about 65% celite diatomaceous earth filler material impregnated with a phenolic resin at about 50 to about 51% resin P.U.

Figure 8:
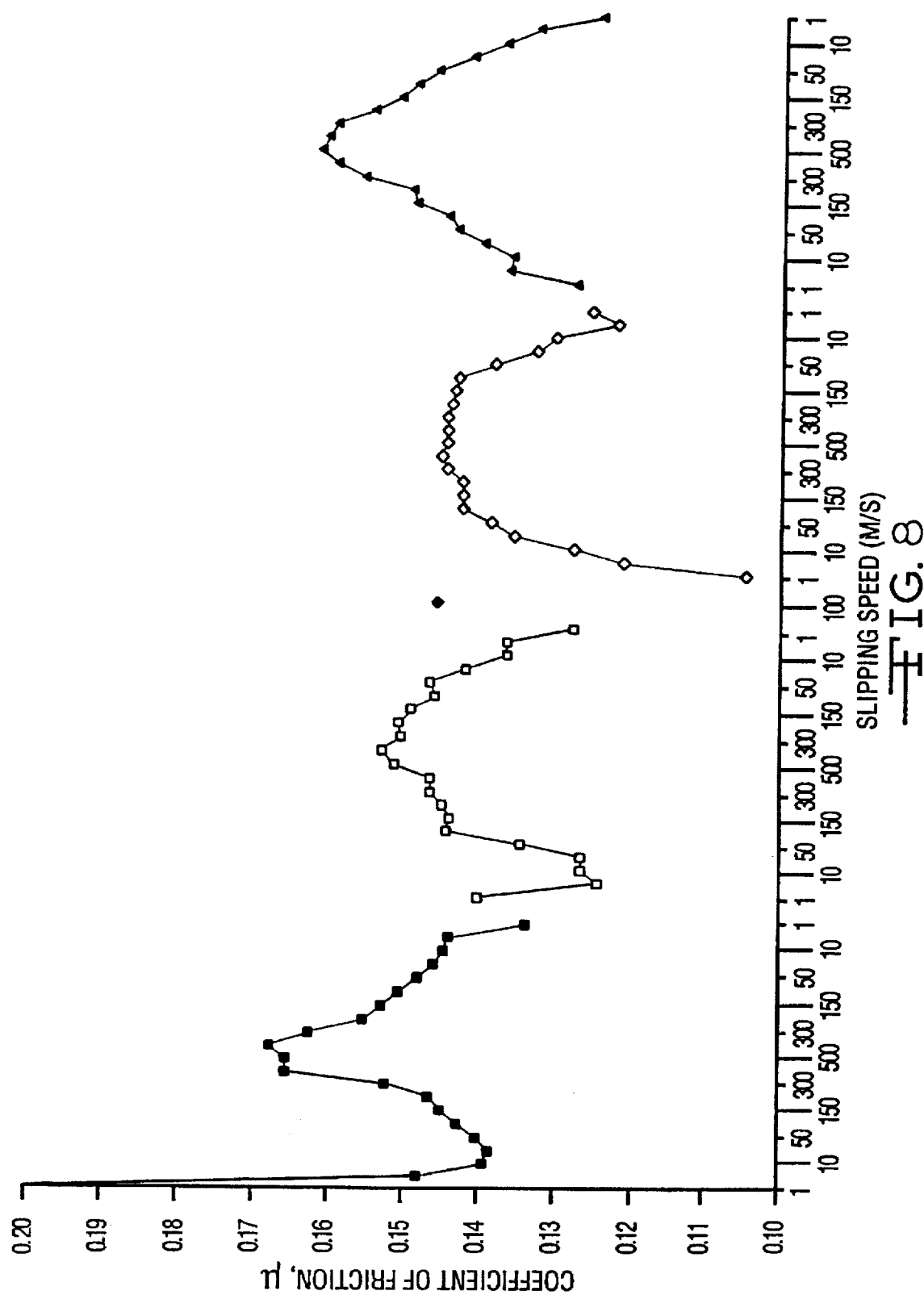

FIG. 8 shows a continuous slip test showing peak coefficients of friction for a fibrous base material (HS-149-93) comprising about 14% cellulose fiber, about 21% Kevlar® aramid fiber pulp and about 65% diatomaceous earth filler material which is impregnated with a modified phenolic resin at about 59.1% resin P.U. The modified phenolic resin is a low-cross-linking density phenolic resin which provides high heat resistance to the friction material.

Figure 9:
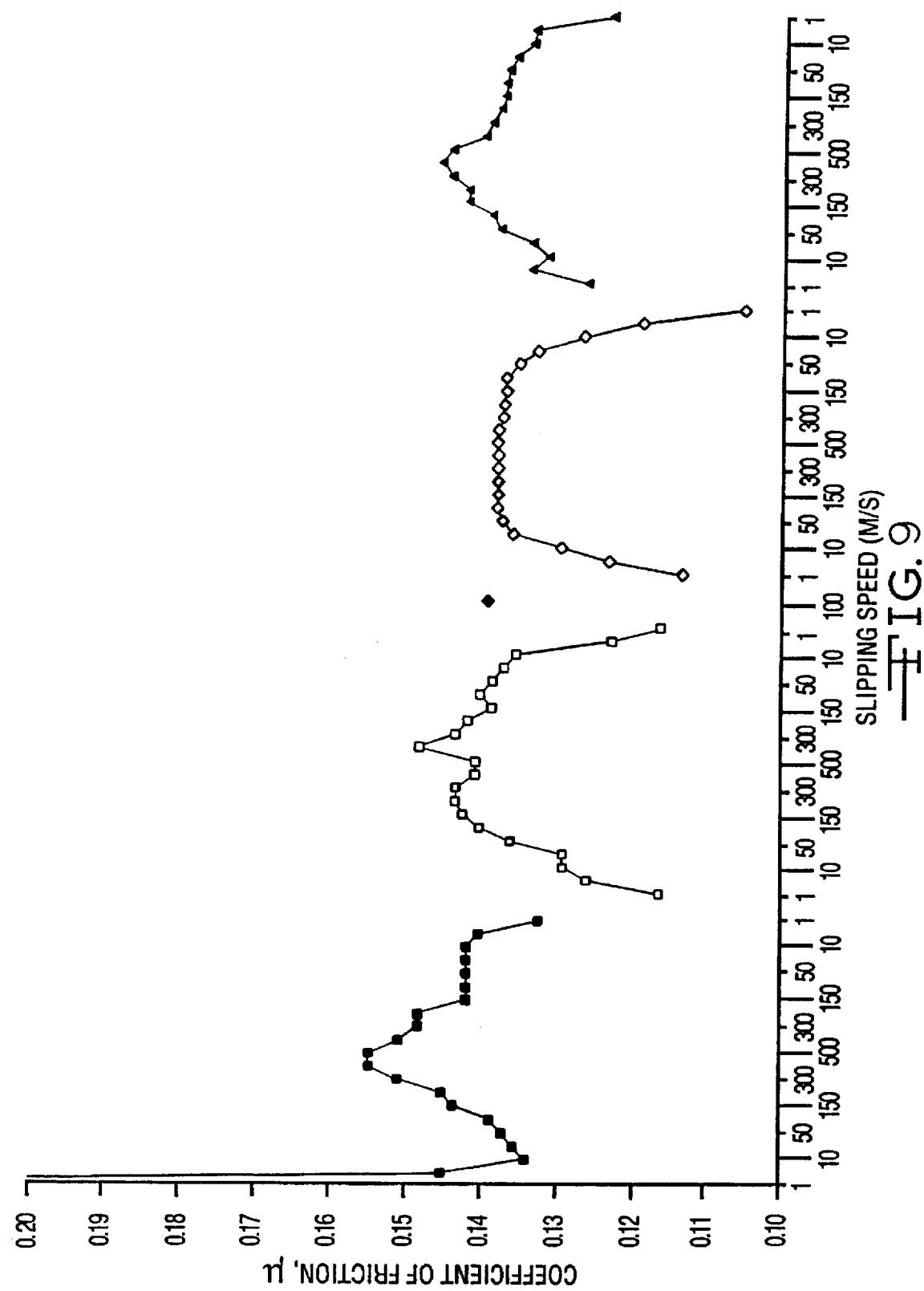

FIG. 9 shows a continuous slip test showing peak coefficients for a fibrous base material of the present invention as described in FIGS. 6 and 7, except impregnated with the modified phenolic resin.

EXAMPLE II

Figure 10:
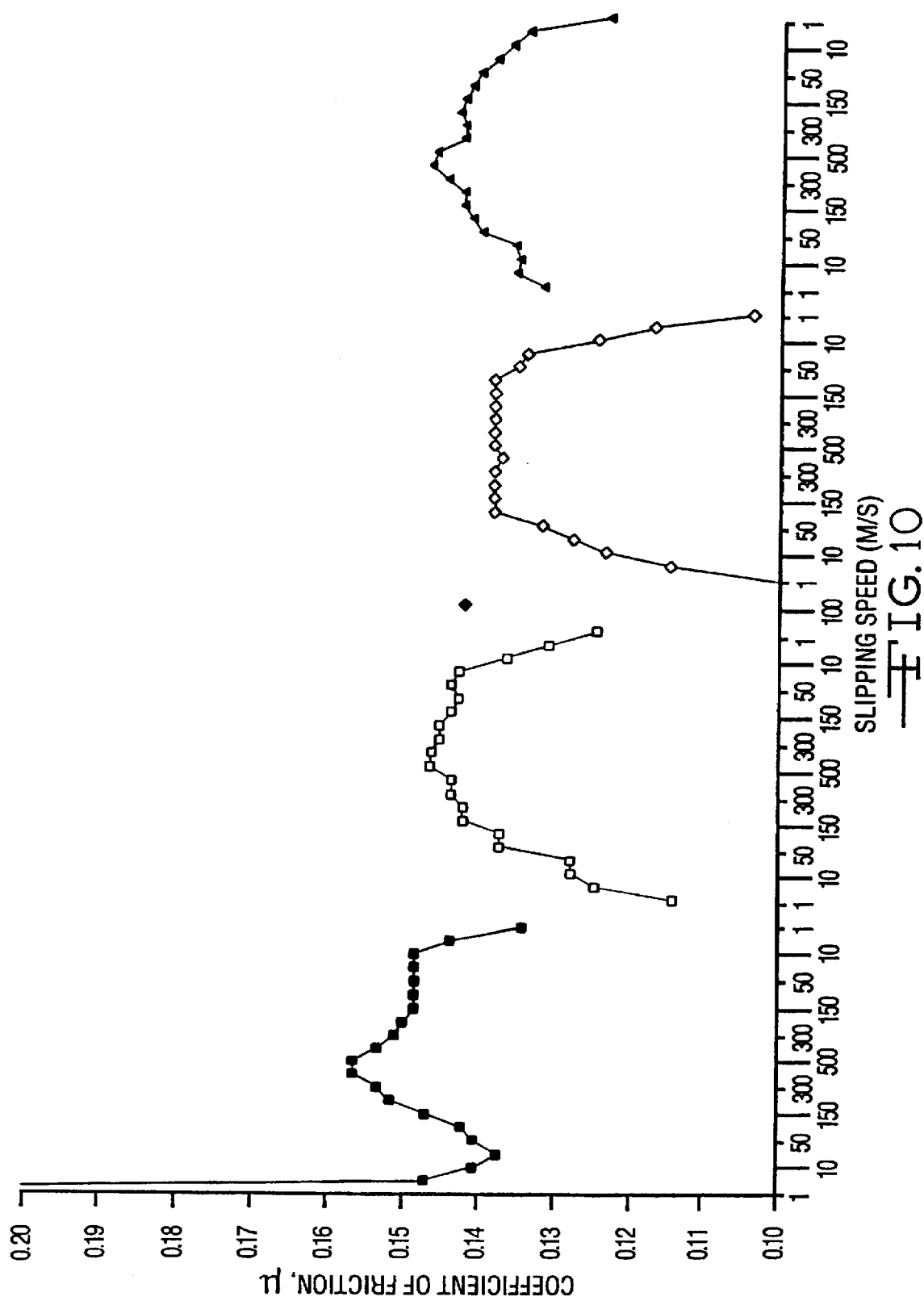
FIGS. 10–11 are graphs showing the peak coefficients of friction versus slipping speed relationship for fibrous base material comprising different types of filler materials for the examples shown in Table II and Example II herein.
Figure 11:
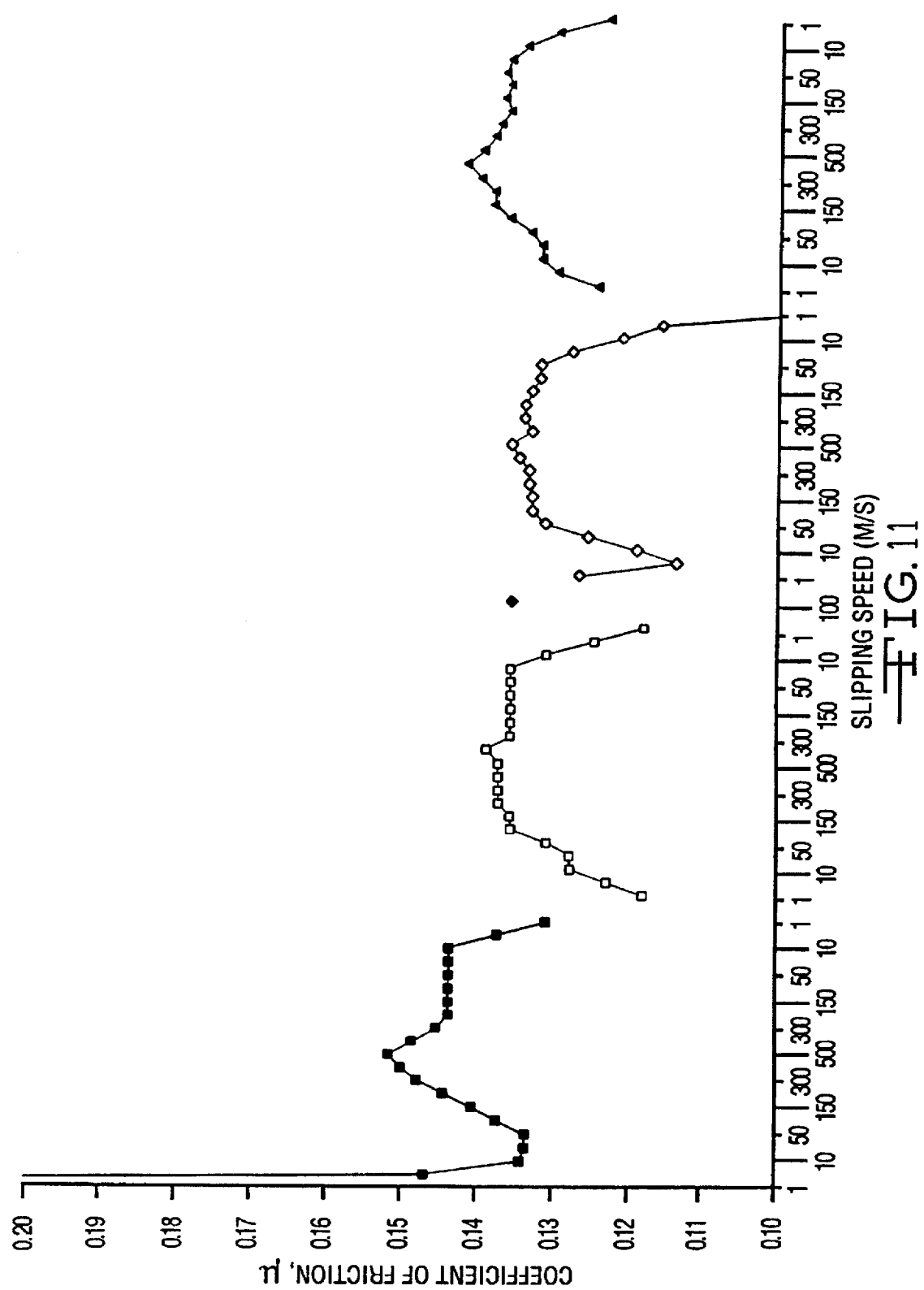

A comparison of peak coefficients of friction for friction materials having difference filler sizes is shown in FIGS. 9–11. Each friction material is impregnated with T II. Table II below shows the mean particle size and dry and wet densities of various filler materials used in friction material comprising about 14% cellulose fibers, about 21% kevlar pulp and about 65% filler material. The fibrous base material is impregnated with a modified phenolic resin. The percent resin pickup for the examples shown in FIGS. 9 and 10 was about 51.3% P.U. The percent resin pickup for the example shown in FIG. 11 was about 50.5% P.U. The examples shown in FIGS. 9, 10 and 11 show a positive slope of coefficient-speed curve, indicating that the materials exhibit good initial "anti-shudder" performance.

TABLE II

| FIGS. | Mean Particle Size (μm) |
| --- | --- |
| 9 | 12 |
| 10 | 22.3 |
| 11 | 36.2 |

EXAMPLE III

Fibrous base materials comprising about 25% cellulose fibers having about 10% hemp fibers and about 15% cotton fibers, about 25% Kevlar® aramid fiber pulp and about 50% diatomaceous earth filler material were impregnated with phenolic or epoxy phenolic resins as shown in Table III below.

Figure 12:
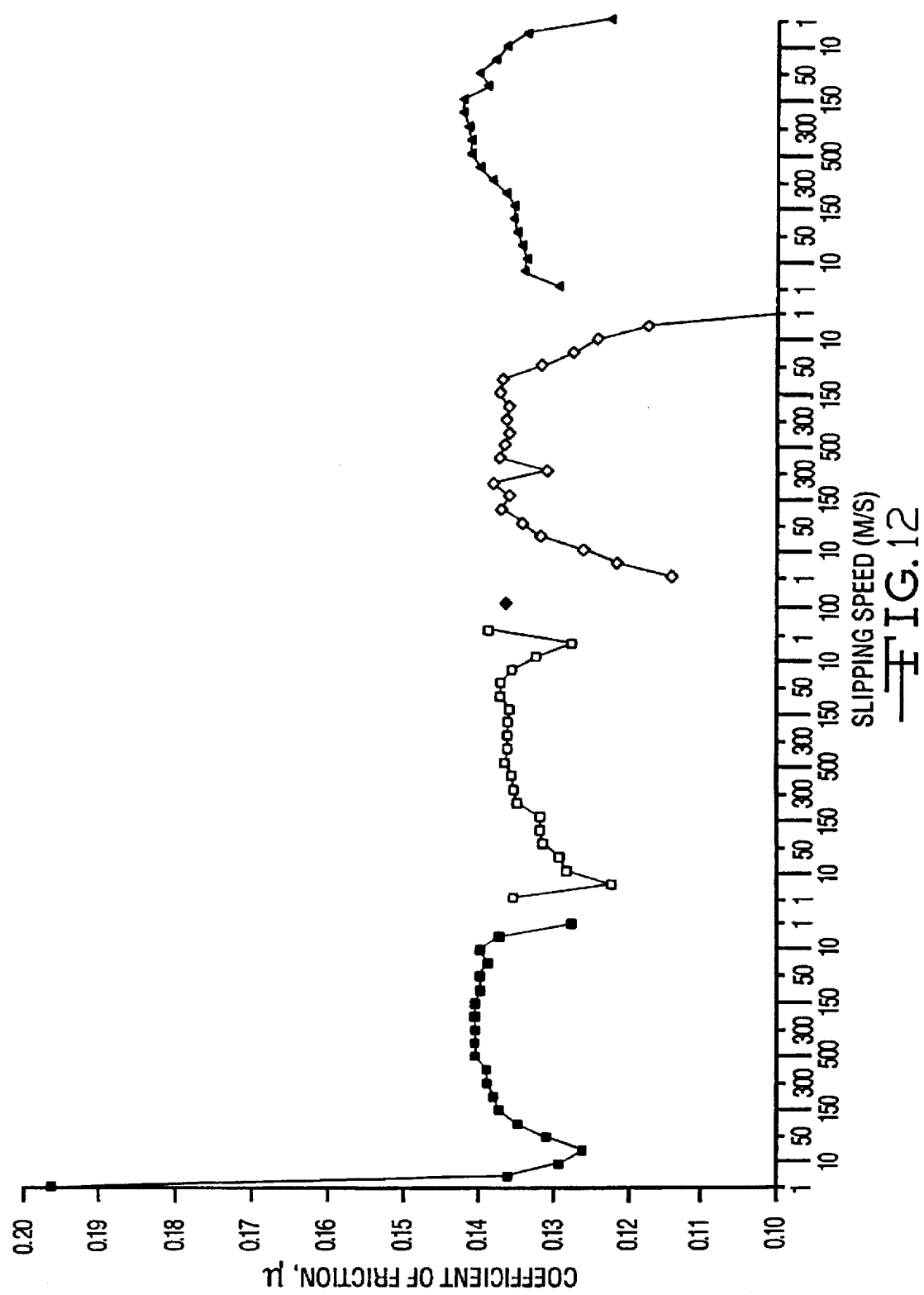
FIGS. 12–14 are graphs showing the peak coefficients of friction versus slipping speed relationship for fibrous base materials impregnated with phenolic or modified phenolic resins for the examples shown in Table III and Example III herein.
Figure 13:
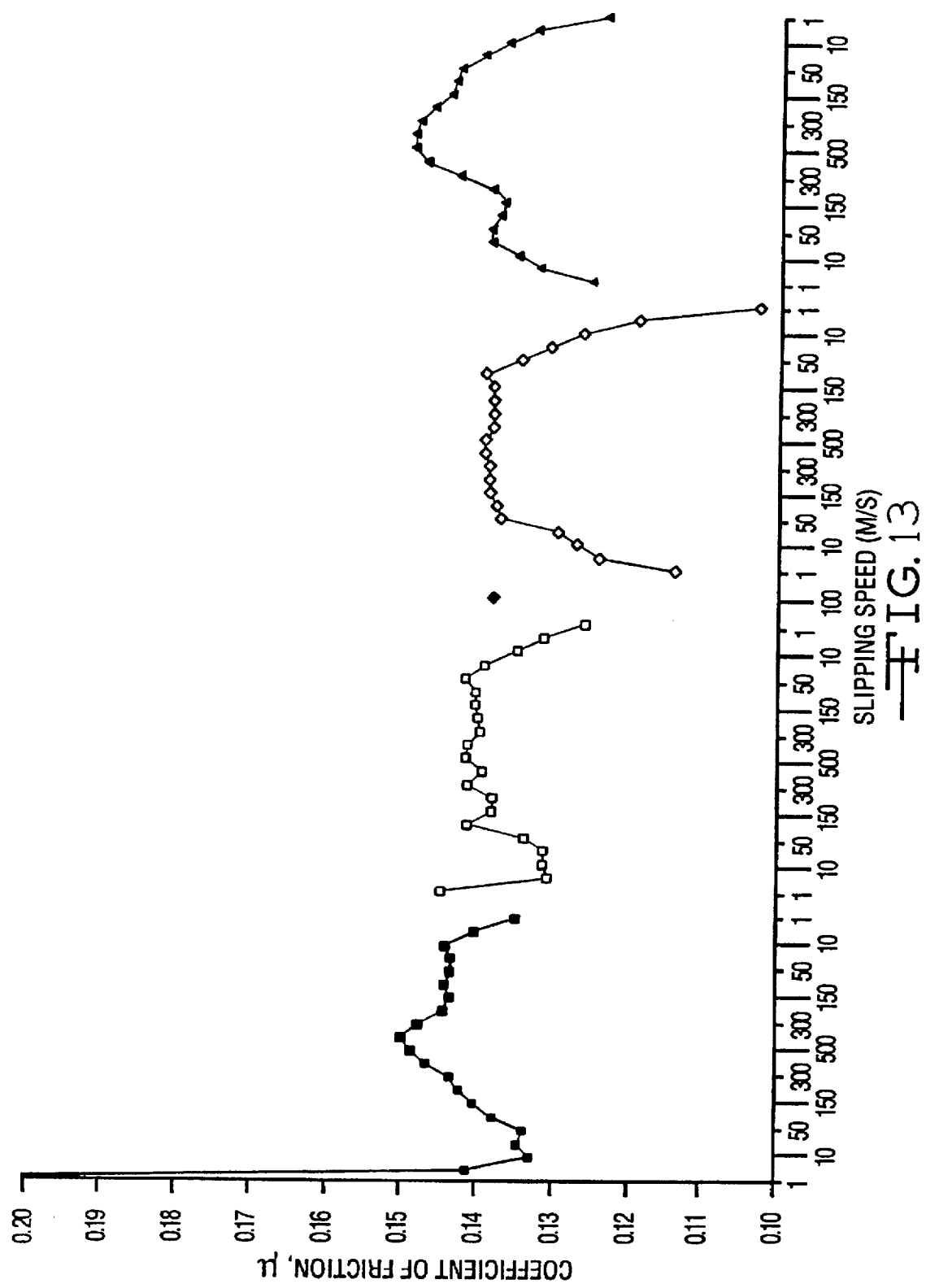
Figure 14:
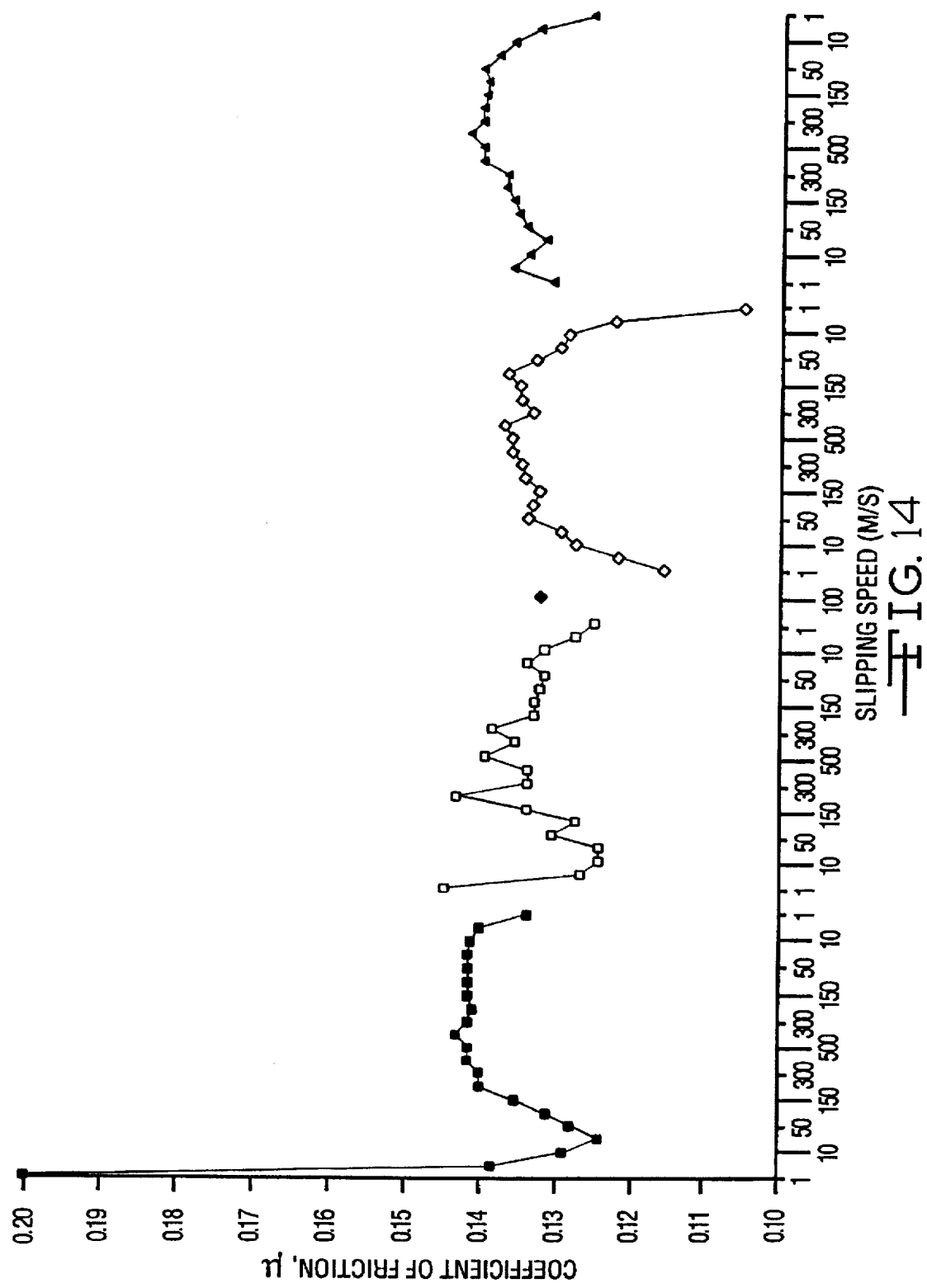
Figure 15:
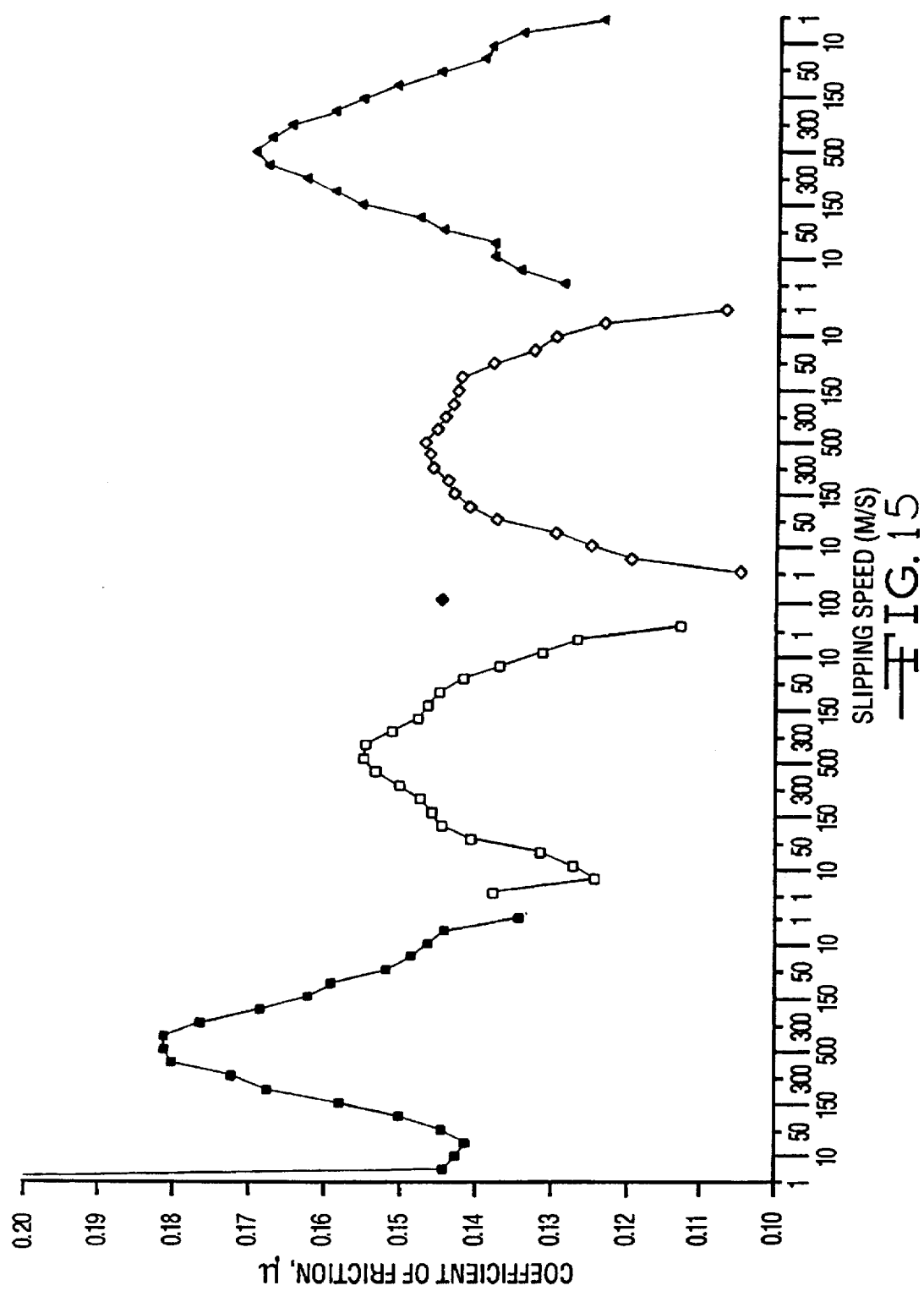
FIGS. 15–17 are graphs showing the peak coefficients of friction versus slipping speed relationship for fibrous base materials impregnated with a modified phenolic resin which were formed under various curing and bonding conditions for the examples shown in Table IV and Example IV herein.
Figure 16:
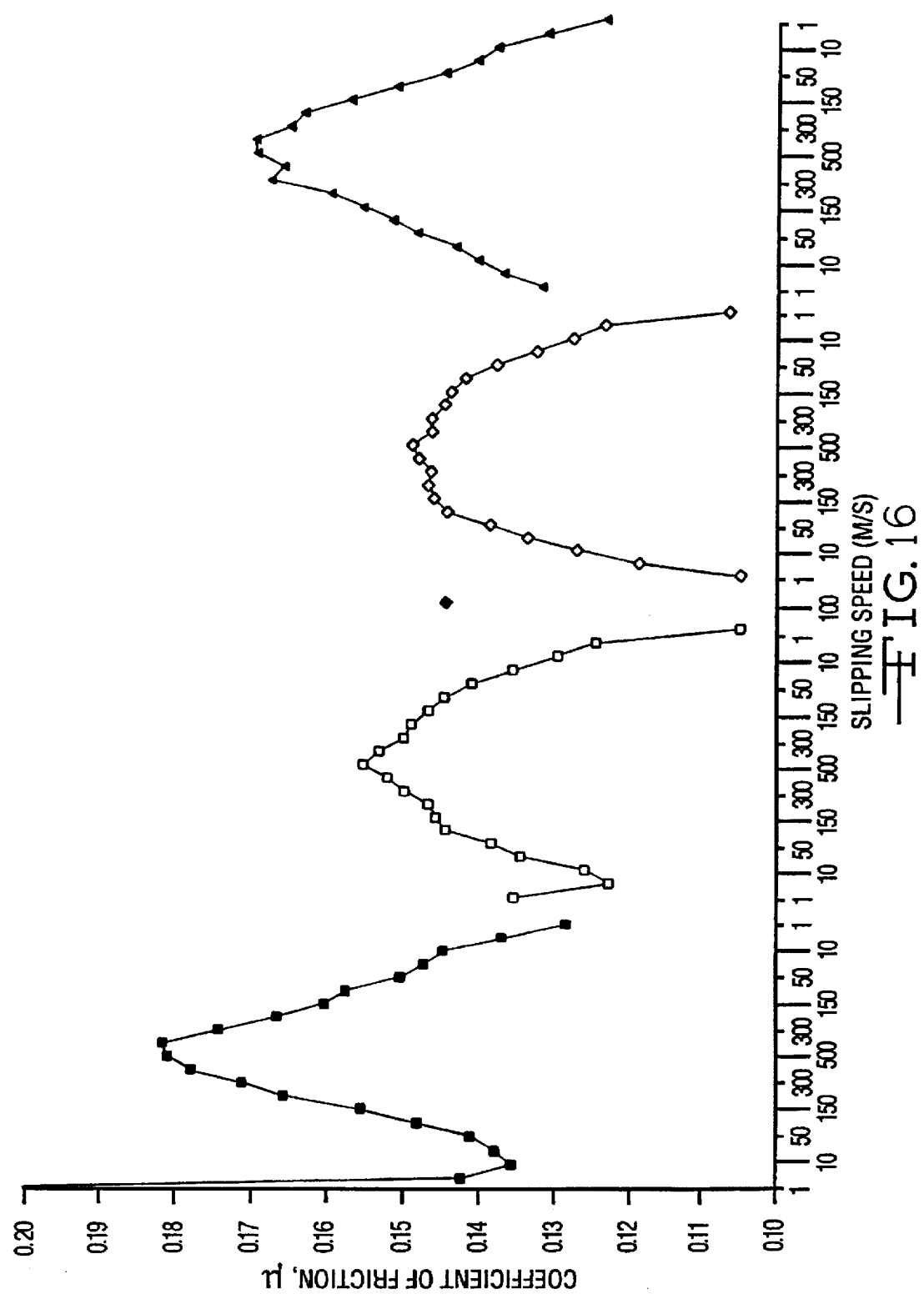
Figure 17:
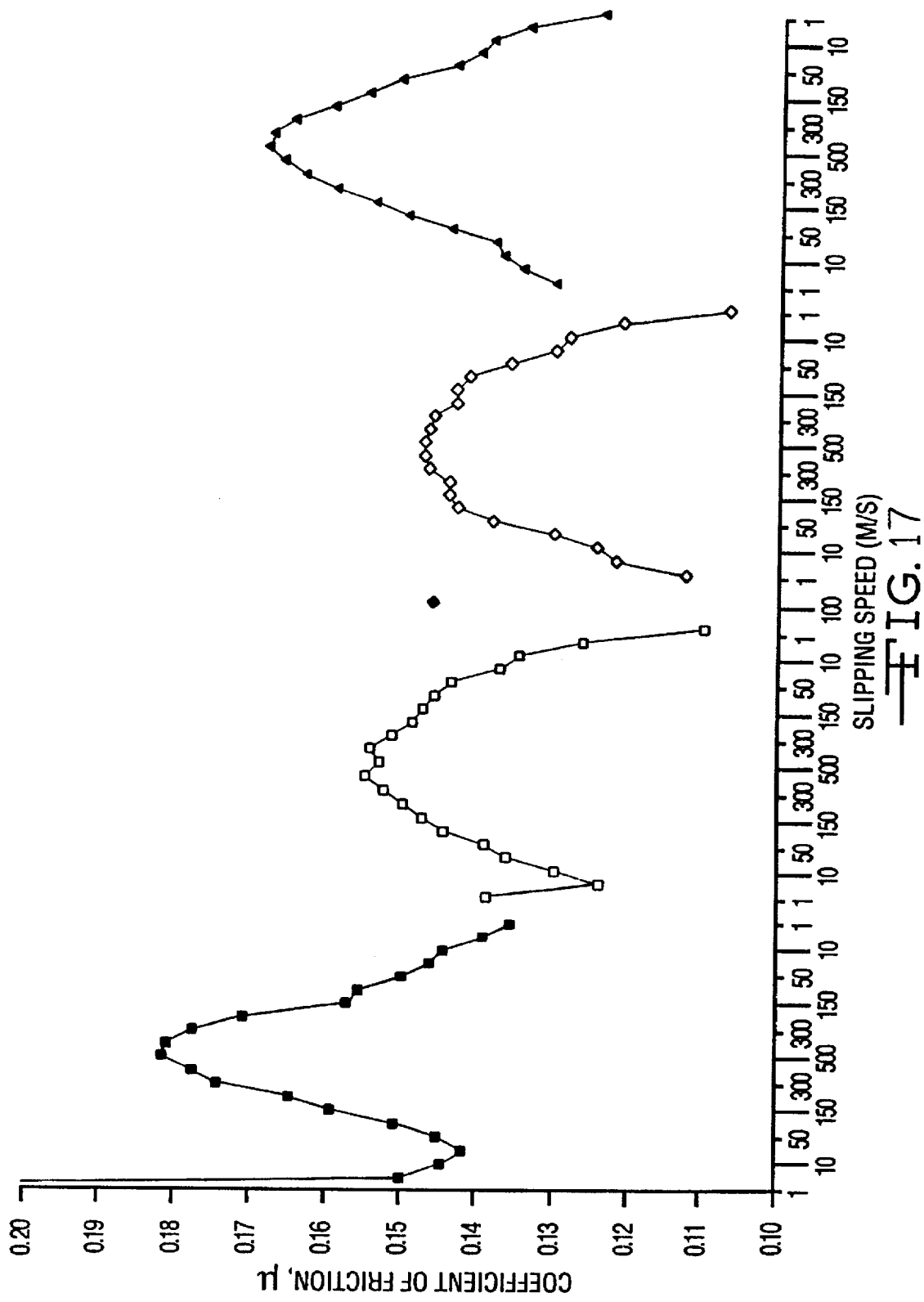

FIG. 12 shows the peak coefficients of friction for a phenolic resin. FIG. 13 shows the peak coefficients of friction for the modified phenolic resin. FIG. 14 shows the peak coefficients of friction for an epoxy-modified phenolic resin.

TABLE III

| FIGS. | Resin | % P.U. |
| --- | --- | --- |
| 12 | Phenolic | 59.6 |
| 13 | Modified Phenolic | 57.4 |
| 14 | Epoxy Modified Phenolic | 56.5 |

EXAMPLE IV

Fibrous base materials comprising about 25% cellulose material, about 25% Kevlar®aramid fiber pulp and about 50% diatomaceous earth filler material were each impregnated with T II ATF. These fibrous materials were impregnated with the modified phenolic resin and processed to obtain different materials' surface roughness, as shown in Table IV below. As shown in FIGS. 15, 16, 17 and 7, the rough surface ($R_a$>105μ in.) of FIG. 7 has a less positive μ-v shape than those of FIGS. 15, 16 and 17, which have a relatively smooth surface ($R_a$<98μ in., preferably $R_a$<80μ in.).

TABLE IV

| FIGS. | Surface Smoothness (Min.) $R_a$ (μ in.) |
| --- | --- |
| 15 | 97.7 |
| 16 | 78.3 |
| 17 | 75.3 |
| 7 | 105.5 |

INDUSTRIAL APPLICABILITY

The present invention is useful as a friction material for use with electrically controlled continuous clutch systems to eliminate "shudder".

The above descriptions of the preferred and alternative embodiments of the present invention are intended to be illustrative and are not intended to be limiting upon the scope and content of the following claims.

We claim:

1. A non-asbestos friction material comprising a fibrous base material impregnated with about 35 to about 65%, by weight, phenolic or modified phenolic resin, the fibrous base material consisting essentially of a plurality of fibrillated aramid fibers having a freeness of about 150 to about 450 on the Canadian Standard Freeness Index, cellulose fibers, and at least one filler material, wherein the filler material is held onto an outer surface of the fibrous base material by the fibrillated aramid fibers; wherein the fibrillated aramid fibers, cellulose fibers and filler material are present in amounts sufficient to provide surface smoothness and shuddering dampening properties to the friction material; the fibrous base material, consisting essentially in percent, by weight, based on the weight of the fibrous base material, about 20 to about 30%, by weight, fibrillated aramid fibers; about 20 to about 30%, by weight, cellulose fibers; and about 50 to about 60%, by weight, diatomaceous earth filler material; wherein the friction material has a coefficient of friction (μ) versus slipping speed (v) relationship, which is defined as dμdv>0 in the speed range of about 0 to about 3 m/sec.

2. A non-asbestos friction material comprising a fibrous base material impregnated with about 35 to about 65%, by weight, phenolic or modified phenolic resin, the fibrous base material consisting essentially of, about 15 to about 25%, by weight, fibrillated aramid fibers having a freeness of about 150 to about 450 on the Canadian Standard Freeness Index; about 20 to about 30%, by weight, cotton cellulose fibers; about 5 to about 15%, by weight, hemp; and about 50 to about 60%, by weight, diatomaceous earth filler material, based on the weight of the fibrous base material, wherein the filler material is held onto an outer surface of the fibrous base material by the fibrillated aramid fibers; wherein the fibrillated aramid fibers, cotton cellulose and hemp fibers and filler material are present in amounts sufficient to provide surface smoothness and shuttering dampening properties to the friction material, and wherein the friction material has a coefficient of friction (μ) versus slipping speed (v) relationship, which is defined as dμdv>0 in the speed range of about 0 to about 3 m/sec.

3. The fibrous base material of claim 1, wherein the filler material comprises particles having a diameter ranging from about 6 to about 38 microns.

4. The fibrous base material of claim 1 consisting essentially of about 25% cellulose fibers, about 25% fibrillated aramid fibers and about 50% diatomaceous earth filler material.

5. The fibrous base material of claim 2 consisting essentially of about 10% hemp fibers and about 20% cotton fibers, about 25% fibrillated aramid fibers, and about 50% diatomaceous earth filler material.

6. The fibrous base material of claim 5 wherein the aramid fibers are present in an amount of about 25%, and the filler comprises diatomaceous earth present in an amount of about 50%.

* * * * *